(12) United States Patent
Menard

(10) Patent No.: US 6,693,351 B2
(45) Date of Patent: Feb. 17, 2004

(54) MECHANICAL CONVERGENCE DEVICE

(75) Inventor: Jean Pierre Menard, Fremont, CA (US)

(73) Assignee: Aurora Systems, Inc., San Jose, CA (US)

(*) Notice: Subject to any disclaimer, the term of this patent is extended or adjusted under 35 U.S.C. 154(b) by 120 days.

(21) Appl. No.: 09/816,833

(22) Filed: Mar. 22, 2001

(65) Prior Publication Data
US 2002/0135000 A1 Sep. 26, 2002

(51) Int. Cl.⁷ .............................................. H01L 23/34
(52) U.S. Cl. ...................... 257/727; 257/798; 257/731; 349/57; 349/58
(58) Field of Search ................................ 257/678, 727, 257/731, 798; 349/57, 58

(56) References Cited

U.S. PATENT DOCUMENTS 6,307,603 B1 * 10/2001 Menard et al. ............... 349/58

2002/0158823 A1 * 10/2002 Zavracky et al. ............. 345/87

* cited by examiner

Primary Examiner—Michael S. Lebentritt
Assistant Examiner—Brad Smith
(74) Attorney, Agent, or Firm—Henneman & Saunders; Larry E. Henneman, Jr.

(57) ABSTRACT

A convergence device 10 for assembly an LCD imaging device 14 to a fixed housing 12. The convergence device 10 has a frame 25 with a plurality of retention arms 26 protruding therefrom. Each of the retention arms 26 has a retention barb 27 for hooking behind a retention land 28 on the imaging device 14. The imaging device 14 has a retainer 18 with a plurality of preload flexures 24 for providing some outward pressure on the frame 15 of the convergence device 10. After the imaging device 14 is positioned on the fixed housing 12, an adhesive 30 is applied to a housing adhesive gap 32 and to a plurality of imager fixing adhesive gaps 34 to hold the convergence device 10 in place relative to the fixed housing 12 and further to hold the imaging device 14 in place relative to the convergence device 10.

21 Claims, 3 Drawing Sheets

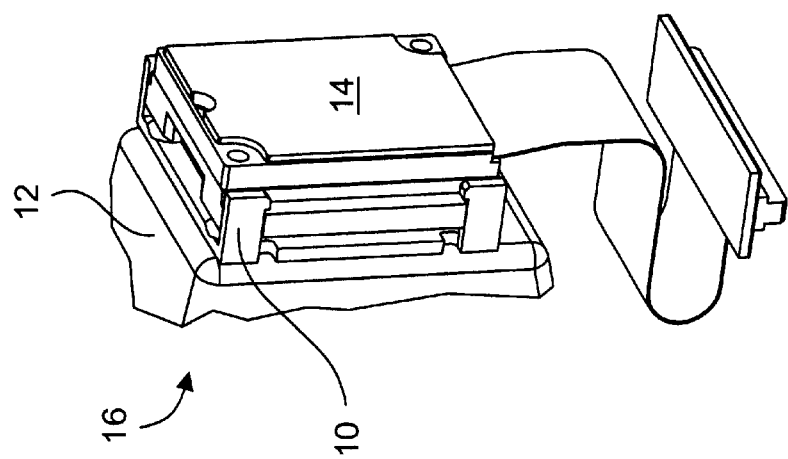
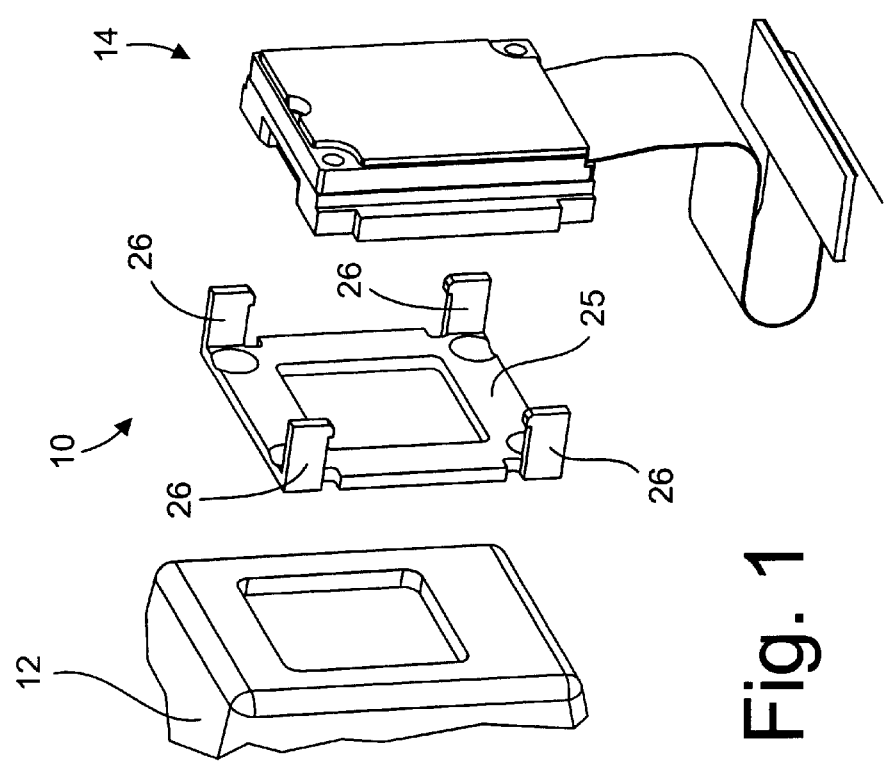

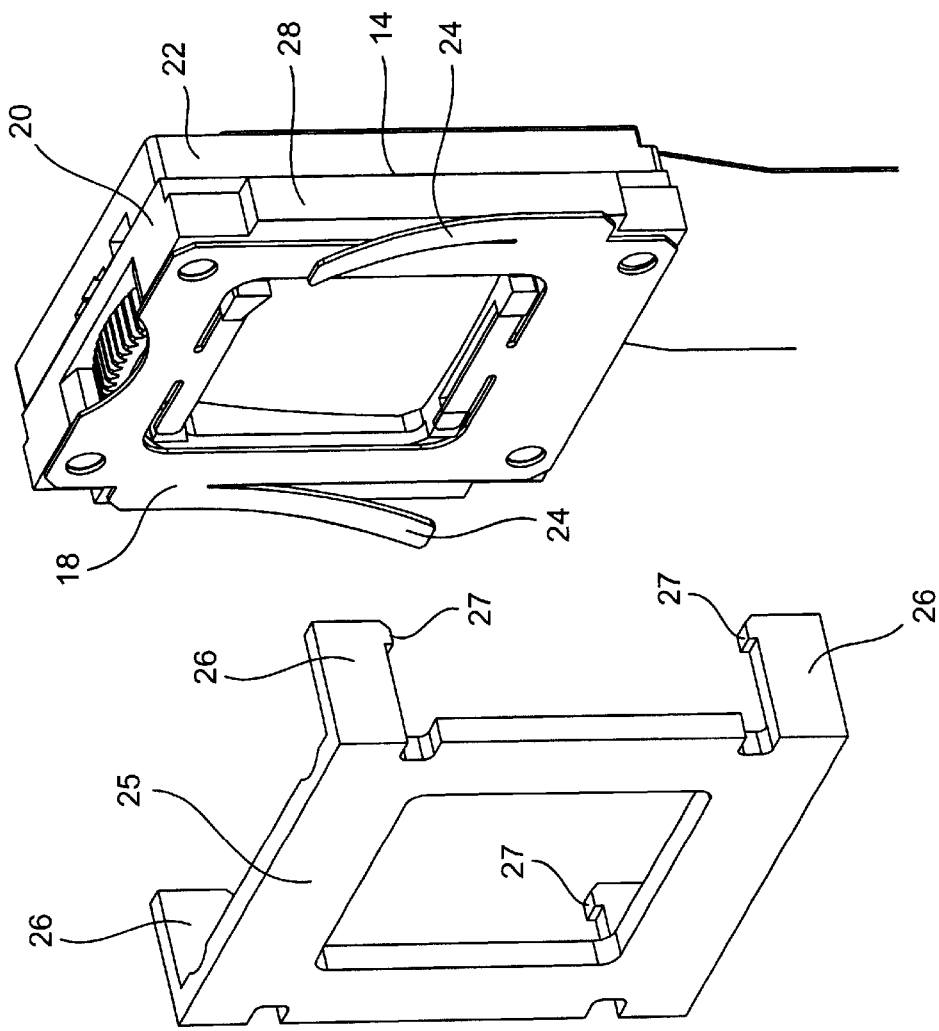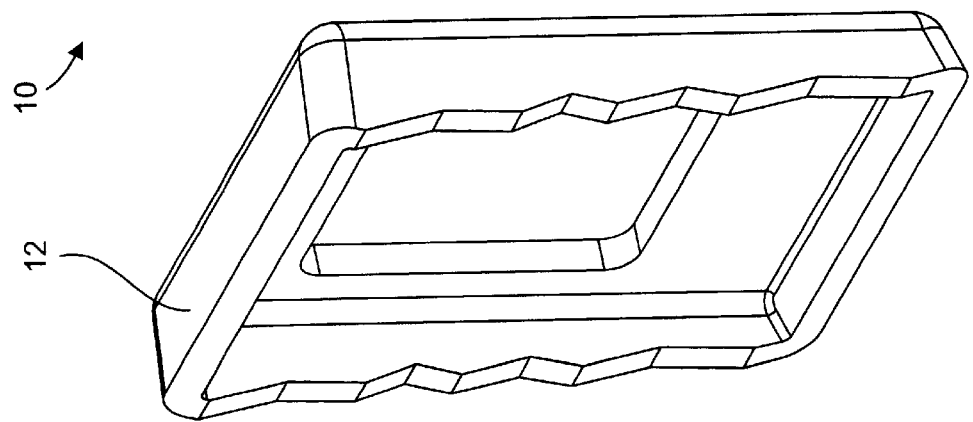

MECHANICAL CONVERGENCE DEVICE

TECHNICAL FIELD

The present invention relates to the field of electronic imaging devices, and more particularly to a method and apparatus for precision placement of an imaging device such as a liquid crystal display ("LCD") imaging device. The predominant current usage of the inventive mechanical convergence device is in the precision positioning of reflective imaging devices in a multi channel projection system, wherein it is particularly important to maintain a precise relationship between a plurality of such imaging devices.

BACKGROUND ART

Projection type imaging devices commonly use micro LCD imagers. Since the pixel size and spacing on these are so small, they must be precisely placed in relation to the surface whereon they are mounted, and in relation to each other. In a liquid crystal projector, white source light is separated into beams of its three primary colors. Each beam is then infused with an image by a liquid crystal light valve or micro-LCD. Finally, the three beams are recombined into a single image and projected onto a display device (a screen).

The micro LCD's generate a representation of the image to be projected by using many small picture elements referred to as pixels. Therefore, the above mentioned beams of light that emerge from the micro-LCD's are pixellated representations of the particular color components of the image. Thus, an accurate projected image requires that the pixels of the three infused beams be precisely aligned during the recombination step, meaning that the micro-LCD's themselves must be carefully positioned. In order to optimally orient the micro-LCD's the following requirements must be met.

(1) 6 degree of freedom (dof) adjustment capability must be available. Both rotation and linear translation with respect to three perpendicular axes are required in order to ensure that proper image alignment can be achieved.

(2) Adjustment mechanisms must have high resolution controls. Because of the small size of the pixels, direct manual adjustments are too crude to achieve proper alignment. Some sort of interface must be provided which can transform relatively large-scale operator inputs into micro-imager motions of a magnitude commensurate with the pixel size.

(3) Adjustment mechanisms must provide positive positioning constraints. Since multiple operations are required to tune all 6 degrees of freedom, intermediate adjustments must have some amount of resistance to motion. Positioning devices typically have some sort of final locking mechanism, but to activate and deactivate that mechanism numerous times over the course of adjustment is cumbersome and often impossible. Therefore, any robust positioning device must provide for physical locating effects, rather than relying on balance, gravity or friction.

(4) The individual magnification of each image must be independently adjustable. There must be a means for making slight adjustments to the projected size of the image from any projection device. This means must be simple, inexpensive, and easy to use such that adjustments can be made quickly during the production process.

In order to accomplish this precise positioning, very precise alignment mechanisms have been developed to carefully position LCD imagers in relation to the common housing. However, there remains the problem of how to hold the imager in position permanently after the alignment mechanism has so precisely temporarily positioned it. It is known in the art to use clear plastic interface parts to maintain thin bond gaps and still permit multi-axis alignment of an imaging device relative to a fixed housing. These interface parts are usually added to the assembly at an integration stage, and need to be restrained into the assembly during the alignment process. In the prior art there have usually been at least two of such parts and they have been cumbersome to handle simultaneously. Special tooling is required to assemble them. Also the tooling may require that the clear interface parts be held in place with an external spring. All of this requires additional time and effort.

It would be advantageous to have something that could be used to hold a micro LCD imager permanently in position on a housing after it is precisely aligned that is inexpensive and easy to manufacture and to use, and which will hold the imager rigidly and securely in position. However, to the inventor's knowledge, all prior art methods and means have involved multiple parts which are cumbersome and time consuming to apply.

SUMMARY

Accordingly, it is an object of the present invention to provide a method and apparatus for mounting an imaging device on a housing which is easy to use.

It is another object of the present invention to provide a method and apparatus for mounting an imaging device on a housing which will hold the imaging device securely and permanently in place.

It is still another object of the present invention to provide a method and apparatus for mounting an imaging device on a housing which is inexpensive to manufacture and to use.

It is yet another object of the present invention to provide a method and apparatus for mounting an imaging device on a housing which will reduce the overall cost of producing a multi beam projection apparatus.

One embodiment of the invention is a single part that straddles the assembly to be converged. In the presently described embodiment of the invention the single part is made of clear plastic. It has a frame that is adapted to be pushed against a fixed housing. Fingers protrude from the frame and cradle the assembly to be converged. The fingers have tips on them that interlock with the assembly and make the interface part captive. A small leaf flexure provides some force away from the assembly, and pushes the frame against the fixed housing when the assembly is moved into position with respect to the fixed housing. The clearances between the frame and the aligned assembly are small. When the assembly is aligned, a small amount of adhesive is allowed to wick into the small gaps. There is also a small gap between the frame and fixed housing. Adhesive is applied and allowed to wick into this gap, as well. The overall result is that there is complete 6-axis freedom of alignment. The bond gaps are kept to a minimum so the adhesive shrinkage has no appreciable effect on the alignment.

It is an object of the present invention to provide a method and apparatus for holding an LCD imager in place precisely as positioned.

It is a further object of the present invention to provide a method and apparatus for holding an LCD imager in place which is easy to apply.

It is still another object of the present invention to provide a method and apparatus for holding an LCD imager in place which is inexpensive to manufacture and to use.

It is yet another object of the present invention to provide a method and apparatus for holding an LCD imager in place which result in a well attached imager.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and advantages. Accordingly, the listed advantages are not essential elements of the present invention, and should not be construed as limitations.

BRIEF DESCRIPTION OF THE DRAWINGS

FIG. 1 is an exploded perspective view of a convergence device according to the present invention, shown in relation to a fixed housing and imaging device to be affixed thereto;

FIG. 2 is a perspective view of an assembled imaging assembly;

FIG. 3 is an exploded perspective view of the imaging assembly of FIG. 2 showing preload flexures on a retainer thereof.

DETAILED DESCRIPTION

Figure 4:
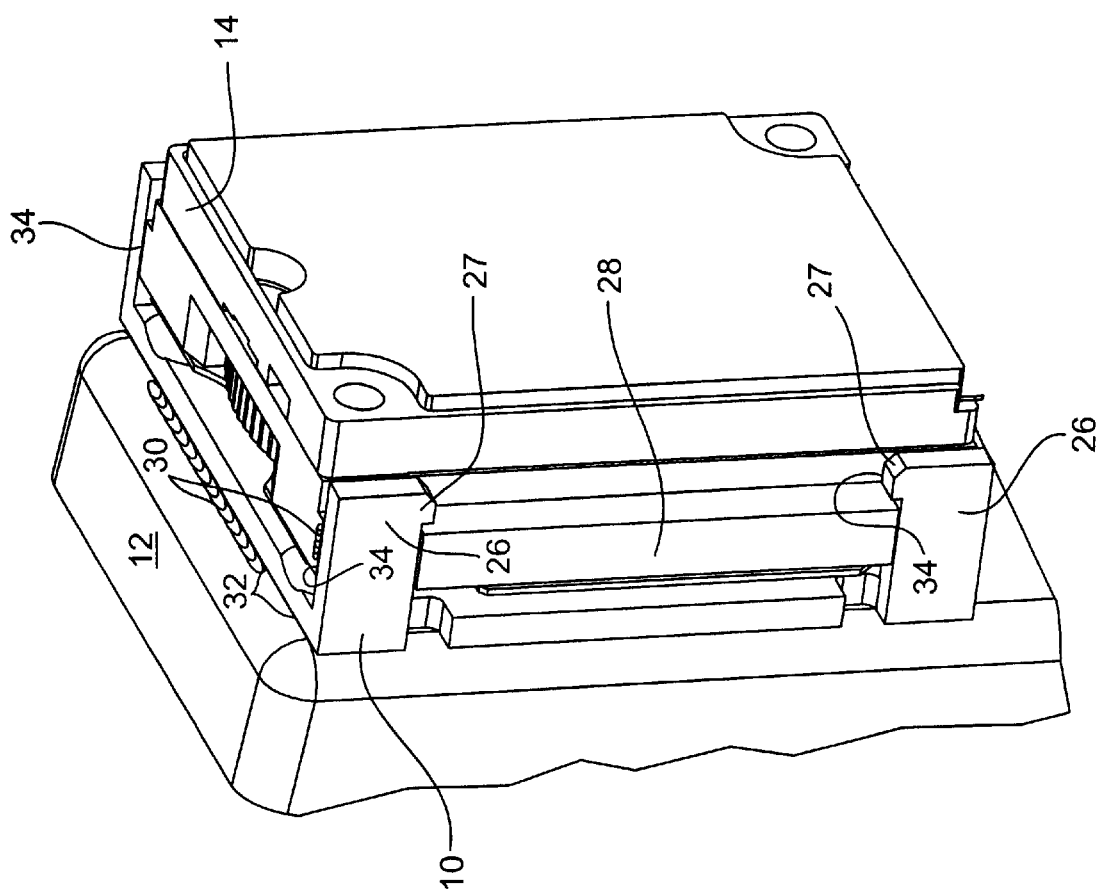
FIG. 4 is a perspective view of the assembled imaging assembly of FIG. 2 showing adhesive applied to gaps provided therefore.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

A known mode for carrying out the invention is an improved convergence device. The improved convergence device is depicted in a perspective view in FIG. 1 and is designated therein by the general reference character 10. Also visible in the view of FIG. 1 are a fixed housing 12 onto which an imaging device 14 is to be mounted. The combination of the imaging device 14, the fixed housing 12 and the convergence device 10 will be referred to herein as an imaging assembly 16 which is shown in an exploded perspective view in FIG. 1 and in the assembled perspective view of FIG. 2.

FIG. 3 is an exploded perspective view of the imaging assembly 16 of FIGS. 1 and 2, showing the imaging assembly 16 from an angle which reveals a retainer 18. The retainer 18 is a part of the imaging device 14 which is used to hold a lens assembly 20 to an LCD imager 22. The retainer 18 is made from a metal which has some resiliency, such as spring steel. According to the present invention, the retainer 18 has a plurality (two, in this present example) of preload flexures 24, the purpose of which will be discussed in more detail hereinafter.

As can also be seen in the view of FIG. 3, the convergence device has a frame 25 with a plurality (four, in this present example) of retention arms 26 projecting therefrom toward the imaging device 14. In this present embodiment of the invention, the retention arms 26 are made from a resilient plastic and are each equipped with a retention barb 27. When the convergence device 10 is pressed onto the imaging device 14, the retention arms 26 will flex sufficiently to allow each of the retention barbs 27 to snap into position behind a pair of retention lands 28 on the imaging device 14. The retention arms 26 are sufficiently long to allow some freedom of movement of the convergence device 10 in relation to the imaging device 14, while the retention barbs 27 prevent the convergence device 10 from coming completely away from the imaging device 14. The preload flexures 24 on the retainer 18, discussed previously herein, press against the frame 25 of the convergence device 10 to provide some slight outward pressure to prevent the convergence device 10 from flopping about overly freely in this temporary configuration.

FIG. 4 is a perspective view of the imaging assembly 16 wherein can be seen locations where an adhesive 30 is applied after the convergence device 10 has been precisely positioned in relation to the fixed housing 10. It should be noted that, before the adhesive 30 is applied, the convergence device 10 is free to move in relation to the fixed housing 12, and the imaging device 14 is free to move relative to the retention arms 26 of the convergence device 10, either collectively and/or individually. Therefore, all degrees of movement that might be necessary for the precise positioning of the imaging device 14 in relation to the fixed housing 12 are available.

After the imaging device 14 is positioned, the adhesive 30 is applied and allowed to wick down into a housing adhesive gap 32 between the convergence device 10 and the fixed housing 12. More uniform results may be obtained if the adhesive 30 is applied to gap 32 at locations which are roughly symmetric about the center of convergence device 10. For example, because adhesive 30 is applied to gap 32 along the top edge of convergence device 10, adhesive 30 should also be applied to gap 32 along the bottom edge (not visible in FIG. 4) of convergence device 10. The inventor has found that sufficient bonding strength between convergence device 10 and fixed housing 12 is achieved by using an amount of adhesive 30 sufficient to cover approximately 5–10% of the contact area.

Also, the adhesive 30 is applied and allowed to wick into each of four (only three of which can be seen in the view of FIG. 4) imager fixing adhesive gaps 34, which are located between each of the retention arms and the imaging device 14. Since each of these gaps 32 and 34 is very small, no matter what the orientation of the imaging device 14 in relation to the fixed housing 12, there is no significant problem with movement caused by the adhesive 30 shrinking as it is cured.

According to the presently described embodiment of the invention 10, the convergence device 10 is made from a clear plastic material such that the adhesive 30 can be of the type which is cured with ultraviolet light, which light can be applied through the clear convergence device 10 after the adhesive 30 is applied. It is within the scope of the invention that some other type of adhesive (not shown) might be used, in which case it might not be necessary to make the convergence device 10 from a clear material.

Various modifications may be made to the invention without altering its value or scope. For example, the size, shape, and placement of components described herein may each or all be varied according to the requirements of the particular application.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

INDUSTRIAL APPLICABILITY

The inventive improved convergence device 10 is intended to be widely used in the construction of projection type imaging devices. Currently, the invention is being applied to the construction of multi channel imaging devices using reflective type LCD devices such that three of the improved imager assemblies 10 are employed in each such device. However, it is within the scope of the invention that other types of display devices (not shown) could be employed, and other types of imaging engines constructed, according to the present inventive method.

The inventor has discovered that application of the present invention provides for a significant reduction in cost of both parts and labor during the construction of the imaging assembly 16. There are fewer parts required, and the effort of putting the assembly together is substantially reduced, resulting in less time spent on the convergence fixture. The reduction in time and parts provides a significant overall cost savings.

Since the improved convergence devices 10 of the present invention may be readily produced and integrated with existing video creation and display systems and devices, and since the advantages as described herein are provided, it is expected that it will be readily accepted in the industry. For these and other reasons, it is expected that the utility and industrial applicability of the invention will be both significant in scope and long-lasting in duration.

I claim:

1. A convergence device for holding an imager in place relative to a fixed housing, comprising:
   a frame; and
   a plurality of arms projecting from said frame, for engaging the imager; and wherein
   said arms are adapted to allow movement of the imager while said arms remain engaged with the imager.

2. The convergence device of claim 1, and further including:
   a retention barb on at least one of said arms for preventing said frame from pulling fully away from the imager.

3. The convergence device of claim 2, wherein:
   the imager includes retention lands; and
   said arms are disposed to engage the imager by said retention barbs snapping behind said retention lands of the imager when said frame is pressed against the imager.

4. The convergence device of claim 3, wherein:
   at least one pair of said arms are disposed to slideably engage one of the retention lands of the imager.

5. The convergence device of claim 1, wherein:
   said arms are sufficiently long to allow movement of the imager toward and away from said frame while said arms remain engaged with the imager.

6. The convergence device of claim 1, and further including:
   a plurality of preload flexures for biasing said frame away from the imager.

7. The convergence device of claim 6, wherein: the preload flexures are embodied in a single-piece retainer.

8. The convergence device of claim 1, and further including:
   an adhesive for affixing said frame to the fixed housing.

9. The convergence device of claim 1, and further including:
   an adhesive for affixing said arms to the imager.

10. A convergence device for holding an imager in place relative to a fixed housing, comprising:
    a frame;
    a plurality of arms projecting from said frame, for engaging the imager; and
    a plurality of preload flexures for biasing said frame away from the imager; and wherein
    the preload flexures are part of a retainer adapted to be fixed to the imager.

11. The convergence device of claim 10, wherein:
    said retainer is further adapted to retain a lens mount in said imager.

12. A convergence device for holding an imager in place relative to a fixed housing, comprising:
    a frame; and
    a plurality of arms projecting from said frame, for engaging the imager; and wherein
    said frame and said arms are formed from a single piece of plastic.

13. A convergence device for holding an imager in place relative to a fixed housing, comprising:
    a frame; and
    a plurality of arms projecting from said frame, for engaging the imager; and wherein
    at least one of said frame and said arms is made from a clear plastic material.

14. A holding device for securing an imager in place on a housing, comprising:
    a frame for abutting the housing; and
    a plurality of arms projecting from said frame to moveably engage the imager;
    whereby the imager is retained by the arms and allowed to move within the arms.

15. The holding device of claim 14, and further including:
    an adhesive for securing said frame to the housing and further for securing said arms to the imager.

16. The holding device of claim 14, and further including:
    a plurality of hooks for limiting movement of the imager away from said frame.

17. The holding device of claim 16, wherein:
    the hooks are protrusions on said arms.

18. The holding device of claim 16, wherein:
the hooks are disposed to at least partially project behind at least a part of the imager when said arms engage the imager.

19. The holding device of claim 16, wherein:
the hooks are adapted to project behind at least one retention land of the imager.

20. The holding device of claim 14, and further including:
a plurality of preload flexures for pressing said frame away from the imager.

21. The holding device of claim 20, wherein A holding device for securing an imager in place on a housing, comprising:
   a frame for abutting the housing;
   a plurality of arms projecting from said frame to moveably engage the imager; and
   a plurality of preload flexures adapted to be affixed to the imager for pressing said frame away from the imager.

* * * * *

UNITED STATES PATENT AND TRADEMARK OFFICE
CERTIFICATE OF CORRECTION

PATENT NO. : 6,693,351 B2
DATED : February 17, 2004
INVENTOR(S) : Menard

It is certified that error appears in the above-identified patent and that said Letters Patent is hereby corrected as shown below:

<u>Column 8,</u>
Lines 1 and 2, delete "The holding device of Claim 20, wherein A holding device for securing an imager in place on a housing," and insert -- A holding device for securing an imager in place on a housing, -- in its place.

Signed and Sealed this

Twenty-fifth Day of October, 2005

JON W. DUDAS
*Director of the United States Patent and Trademark Office*